United States Patent
Li et al.

[11] Patent Number: 5,850,550
[45] Date of Patent: Dec. 15, 1998

[54] NO PREPROCESSOR AND A SOURCE LEVEL DEBUGGER FOR EMBEDDED SQL IN A 3GL

[75] Inventors: Chin Hsiang Li; I-Shin Andy Wang; Wei Young; Shu Huar Joseph Yeh; John Shek-Luen Ng, all of San Jose; Kuo-Wei Hwang, Milpitas; Mir Hamid Pirahesh; Tak-Ming Lo, both of San Jose, all of Calif.

[73] Assignee: International Business Machine Corporation, Armonk, N.Y.

[21] Appl. No.: 521,711

[22] Filed: Aug. 31, 1995

[51] Int. Cl.[6] .................................................. G06F 9/45
[52] U.S. Cl. ............................................ 395/708; 395/704
[58] Field of Search .................................. 395/705, 707, 395/708, 704

[56] References Cited

U.S. PATENT DOCUMENTS

| | | | |
|---|---|---|---|
| 5,230,049 | 7/1993 | Chang et al. | 395/708 |
| 5,371,747 | 12/1994 | Brooks et al. | 371/19 |
| 5,504,885 | 4/1996 | Alashqur | 395/705 |
| 5,551,015 | 8/1996 | Goettelmann et al. | 395/707 |

OTHER PUBLICATIONS

Beck, L.L., "System Software—An Introduction to Systems Programming," 2nd Ed., Addison–Wesley Publishing, Reading, MA, pp. 292–293 and 297–298, Mar. 1990.

*Primary Examiner*—Emanuel Todd Voeltz
*Assistant Examiner*—Peter J. Carcoran, III
*Attorney, Agent, or Firm*—Sterne, Kessler, Goldstein & Fox P.L.L.C.; Prentiss W. Johnson, Esq.

[57] ABSTRACT

A system and method for translating source code, comprising high level source code with embedded SQL statements, to p-code or machine-language instructions by a one-pass parsing mechanism. The one-pass parsing mechanism generates executable code without the need to generate an intermediate file. Additionally, the p-code or machine-language instructions are annotated with references to the line numbers of the corresponding source code, thereby allowing a source level debugger to debug the source code with embedded SQL statements.

25 Claims, 3 Drawing Sheets

NO PREPROCESSOR AND A SOURCE LEVEL DEBUGGER FOR EMBEDDED SQL IN A 3GL

CROSS-REFERENCE TO OTHER APPLICATIONS

The following applications of common assignee contain some common disclosure, and are believed to have an effective filing date identical with that of the present application.

"SYSTEM AND METHOD FOR ENABLING A COMPILED COMPUTER PROGRAM TO INVOKE AN INTERPRETIVE COMPUTER PROGRAM," Ser. No. 08/521,805 now U.S. Pat. No. 5,675,804, incorporated herein by reference in its entirety.

"PLATFORM-TRANSPARENT REGISTRATION AND BUILD OF STORED PROCEDURES AND USER-DEFINED FUNCTIONS," Ser. No. 08/521,804 now U.S. Pat. No. 5,657,447, incorporated herein by reference in its entirety.

"PASSING STRUCTURES OR ARRAYS AS HOST VARIABLES," Ser. No. 08/521,710 now U.S. Pat. No. 5,742,810, incorporated herein by reference in its entirety.

"SYSTEM AND METHOD FOR ENABLING POINTERS TO BE PASSED FROM COMPUTER PROGRAMS WRITTEN USING COMPUTER PROGRAMMING LANGUAGES THAT DO NOT SUPPORT POINTERS," Ser. No. 08/521,806, incorporated herein by reference in its entirety.

DESCRIPTION

1. Technical Field

This invention relates to computer software compilers and interpreters, and more specifically to a compiler and interpreter that translates high level source code of a third generation language (3GL) with embedded structured query language (SQL) statements to executable code by a one-pass parsing mechanism. This one-pass parsing mechanism eliminates the need for a preprocessor to translate the embedded SQL statements and generate an intermediate file as well as,provides for a source level debugger that can debug high level source code statements with embedded SQL statements.

2. Background Art

A computer program is most often written, or coded, in a high level language, such as a 3GL, and is termed source code. The source code is readable text and understood by software developers. The source code must be translated by either a compiler or interpreter to produce an executable image that can be run on a computer. A compiler processes the source code and produces assembly code. The assembly code is then further processed by a linker and loader to produce an object file. The object file is an executable image comprising machine language instructions.

Contrary to a compiler, an interpreter translates and executes the source code without producing assembly code. The majority of conventional 3GLs require a compiler, linker and loader. Some languages, however, such as BASIC and LISP, are interpreted. Some interpreted language parsers, including some implementations of BASIC, produce an intermediate, lower-level, optimized code called "p-code," which is executed by the interpreter at run-time. Both object code and p-code are executable. An interpreter executes p-code; the operating system computes and executes object code.

Software developers often use a source level debugger to assist in the testing of a computer program. A source level debugger provides a testing environment that correlates the line of source code with the executable image. In operation, a source level debugger lets a software developer "walk through" the source code as the corresponding machine-language instructions are executed. A conventional source level debugger lets a software developer set breakpoints and tracepoints in the source code, incrementally execute constructs in the source code or machine-language instructions, and view the execution of the program in terms of the source code or machine-language instructions.

Many computer software applications require access to the functions of a relational database to ensure the efficient management and availability of data. As a result, source code often contains embedded SQL statements to interface with a selected relational database. The immediate problem with embedding SQL statements in the source code of a program written in a 3GL is that the compiler or interpreter cannot process the SQL statements. High level language compilers and interpreters cannot recognize the SQL statements, but rather can only recognize and process the high level language for which they were written.

A known solution to this problem is to implement a two-pass parsing mechanism that preprocesses the source code as shown in FIG. 1. In pass 1 112, an SQL preprocessor 104 takes as input the source code 102 with the embedded SQL statements and translates only the SQL statements to the target high level language. The SQL preprocessor 104 generates an intermediate file 106 containing both the original high level source code and the new code resulting from the SQL translation. In pass 2 114, the target language compiler/interpreter 108 takes as input the intermediate file 106 and generates executable code 110.

The conventional two-pass parsing mechanism has many problems. First, it is very time consuming to generate the intermediate file because the original source code must be read and translated by the preprocessor then written to an output intermediate file. Second, both the original source code and the intermediate file are processed resulting in the high level source code being read twice. The SQL preprocessor first reads the original high level source code as it rewrites it to the intermediate file. Next, the compiler or interpreter reads the original high level source code from the intermediate file to translate it and generate the executable code. Third, software developers have to manage both the original source code and the intermediate file thereby increasing the demands of configuration management. Fourth, the SQL preprocessor is unable to maintain the scope of host variables used in the SQL statements because in a conventional two-pass parsing mechanism the SQL preprocessor understands only the syntax of SQL, not the syntax of the host 3GL. Therefore, host variables must be declared in special SQL declare sections. One way to solve this problem is to maintain the two-pass parsing mechanism described in FIG. 1 and have the SQL preprocessor understand enough about the host 3GL syntax to maintain the scope of host variables. This, however, requires duplicate parsing of SGL syntax in both passes. Therefore, there is a need for a compiler and interpreter that can parse source code embedded with SQL statements and generate executable code file without generating an intermediate file.

Another problem associated with source code embedded with SQL statements relates to source level debuggers. Conventional source level debuggers require the intermediate file as input, not the original source code with the embedded SQL statements. When stepping through lines of source code as the software executes, the debugger can either correlate the executable code with the intermediate file, in which case the developer will not recognize the translated SQL statements, or correlate the executable code with the original source file, in which case the source file will be out of synchronization with the executable file because the line numbers will not match. The debugger uses the line numbers derived from the intermediate file for display purposes to the developer and these line numbers do not correspond to the line numbers of the source file. Therefore, there is a need for a compiler and interpreter that can parse source code embedded with SQL statements and generate executable code without generating an intermediate file.

DISCLOSURE OF INVENTION

The present invention solves the problem of requiring an SQL preprocessor to translate high level source code with embedded SQL statements and generate an intermediate file by implementing a one-pass parsing mechanism. This one-pass parsing mechanism translates each line of the source code, containing both high level source code and embedded SQL statements, to the target object code without generating an intermediate file. The source file is read and processed line by line. When a line of high level source code is encountered, it is directly compiled or interpreted to executable code. When an SQL statement is encountered, it also is directly parsed and translated to executable code thereby not generating an intermediate file. Additionally, the executable code is annotated with references to the corresponding source code to enable a source level debugger to function with a correct mapping.

There are numerous advantages and features of implementing a one-pass parsing mechanism for embedded SQL statements. First, the one-pass mechanism allows for a quicker and more efficient compilation or interpretation of source code. An intermediate file does not have to be created nor managed. Second, the scope of host variables used in the embedded SQL statements is maintained, thereby neither placing limitations on a developer's programming structure nor requiring a two-pass parsing mechanism. Third, source level debuggers are able to provide a developer with the correct correlation between a line of source code, whether a line of high level source code or an SQL statement, and its executable instructions. Fourth, the interpretation of source code with embedded SQL statements is enabled, providing immediate execution of source code as in other interpreters, but also optimized execution of embedded SQL statements as in compiled languages.

BRIEF DESCRIPTION OF DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

BEST MODE FOR CARRYING OUT THE INVENTION

Figure 4:
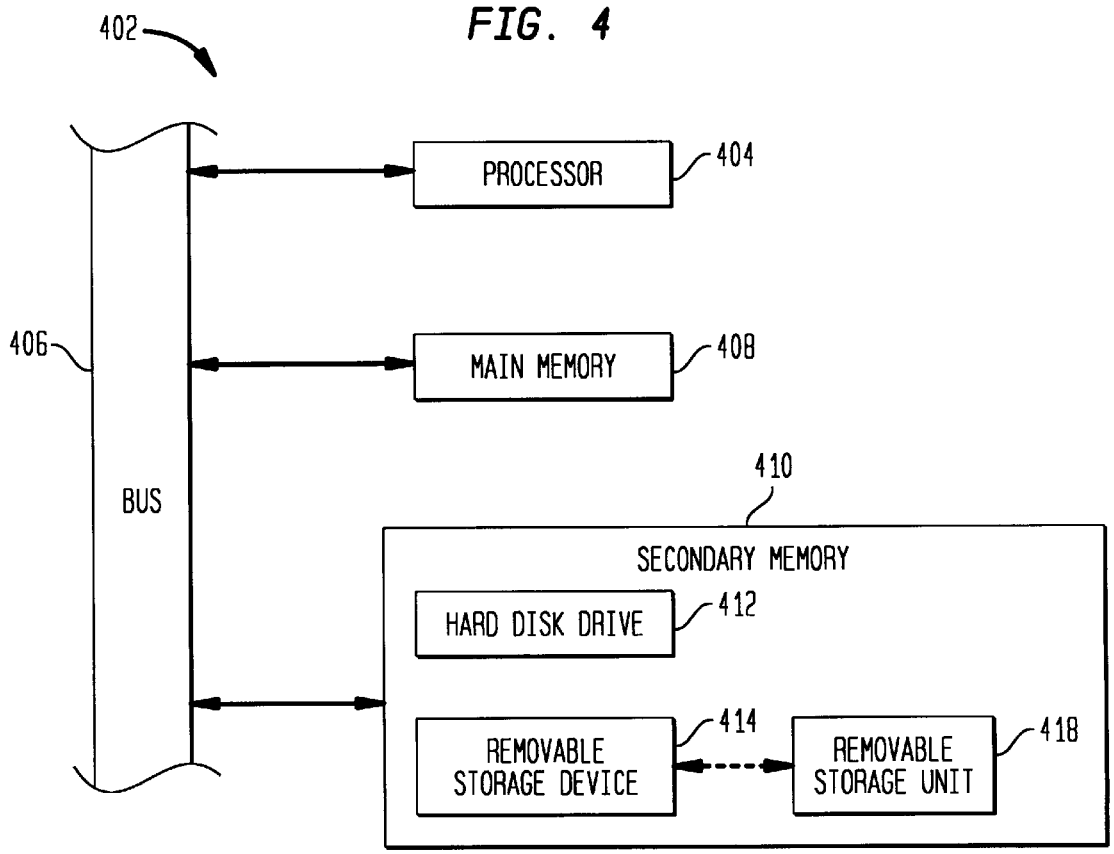
FIG. 4 shows a block diagram of a computer system useful for implementing the present invention.

In one embodiment, the invention is directed to a computer system operating as discussed herein. An exemplary computer system 402 is shown in FIG. 4. The computer system 402 includes one or more processors, such as processor 404. The processor 404 is connected to a communication bus 406.

The computer system 402 also includes a main memory 408, preferably random access memory (RAM), and a secondary memory 410. The secondary memory 410 includes, for example, a hard disk drive 412 and/or a removable storage drive 414, representing a floppy disk drive, a magnetic tape drive, a compact disk drive, etc. The removable storage drive 414 reads from and/or writes to a removable storage unit 418 in a well known manner.

Removable storage unit 418, also called a program storage device or a computer program product, represents a floppy disk, magnetic tape, compact disk, etc. As will be appreciated, the removable storage unit 418 includes a computer usable storage medium having stored therein computer software and/or data.

Computer programs (also called computer control logic) are stored in main memory and/or the secondary memory 410. Such computer programs, when executed, enable the computer system 402 to perform the features of the present invention as discussed herein. In particular, the computer programs, when executed, enable the processor 404 to perform the features of the present invention. Accordingly, such computer programs represent controllers of the computer system 402.

In another embodiment, the invention is directed to a computer program product comprising a computer readable medium having control logic (computer software) stored therein. The control logic, when executed by the processor 404, causes the processor 404 to perform the functions of the invention as described herein. The invention may be implemented using standard programming techniques. The resulting program(s) may be stored on disk, diskettes, memory cards, ROM or any other memory device. For execution the program may be copied into the RAM of the computer. One skilled in the art of computer science will easily be able to combine the software created as described with appropriate general purpose or special purpose hardware to create a system.

In another embodiment, the invention is implemented primarily in hardware using, for example, a hardware state machine. Implementation of the hardware state machine so as to perform the functions described herein will be apparent to persons skilled in the relevant arts.

The present invention is described in terms of a computer program executing within a computer system 402. Description in these terms is provided for convenience only. It is not intended that the invention be limited to application in this example environment. In fact, after reading the following description, it will become apparent to a person skilled in the relevant art how to implement the invention in alternative environments.

Figure 1:
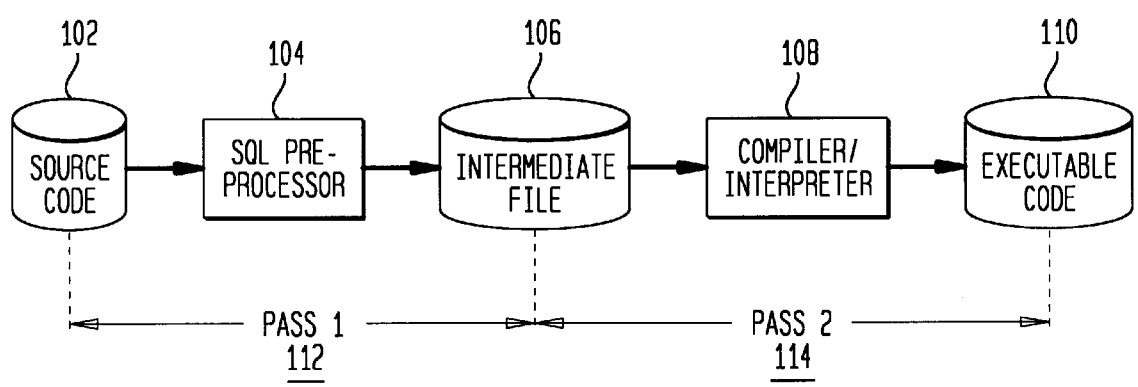
FIG. 1 shows a block diagram of the conventional two-pass mechanism for compiling or interpreting high level source code embedded with SQL statements.
Figure 2:
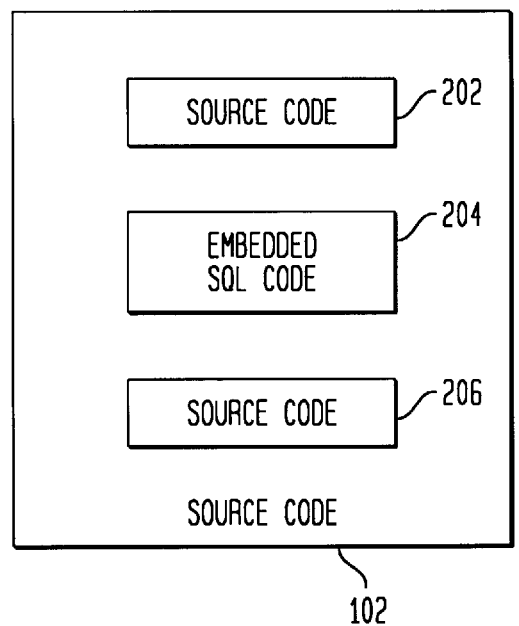
FIG. 2 shows a sample file containing high level source code embedded with SQL statements.
Figure 3A:
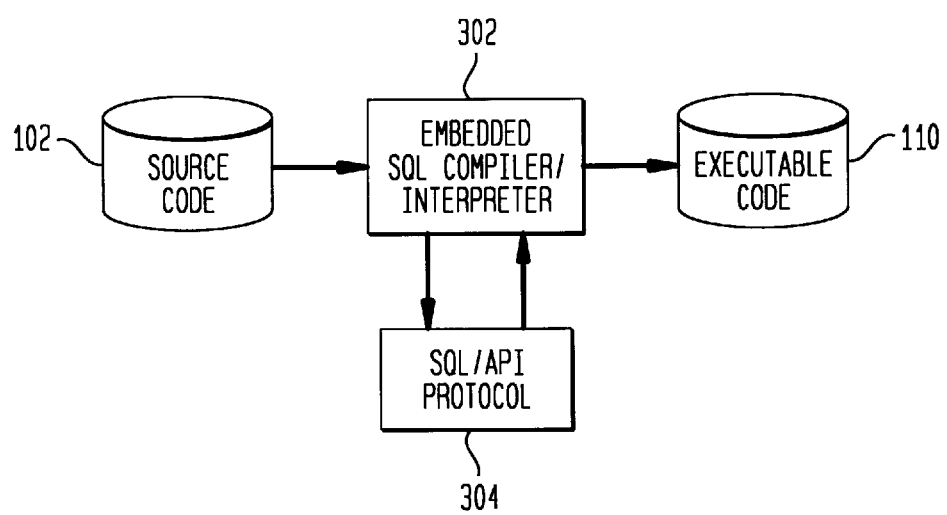
FIG. 3A shows a block diagram of the one-pass parsing mechanism for compiling or interpreting high level source code embedded with SQL statements.

The overall flow of the one-pass parsing mechanism is illustrated in FIG. 3A. An embedded SQL compiler/ interpreter 302 takes as input source code 102 and generates executable code 110. As shown in FIG. 2, the source code contains lines of high level source code 202, 206, written in a 3GL and with embedded SQL statements 204. A compiler/interpreter is incorporated into the one-pass parsing mechanism depending on whether the selected 3GL requires a compiler or interpreter.

In operation, the embedded SQL compiler/interpreter 302 reads the source code 102 one line at a time. Each line is parsed to determine whether the line is written in the 3GL or is an embedded SQL statement. If the line is true 3GL code, then it is compiled or interpreted in a manner that is well-known in the relevant art. If the line is an embedded SQL statement, the embedded SQL compiler/interpreter accesses an SQL/API protocol 304 to further parse and translate the SQL statement into the target executable code. In both cases, the embedded SQL compiler/interpreter annotates the executable code with a reference to the corresponding line of source code in a manner that is well-known in the relevant art.

A person skilled in the relevant arts would be able to develop an alternate interface and translation necessary for the SQL/API protocol 304. For instance, the SQL/API protocol 304 may comprise a parsing mechanism that interfaces with a plurality of look-up tables, a sequence of subroutine calls, or a combination of both. One embodiment of the SQL/API protocol 304 comprises parsing and recognizing the embedded SQL tokens, thereby triggering the generation of pre-compilation application programming interface (API) statements for each SQL statement. Next, the API statements are compiled or interpreted into executable code.

Figure 3B:
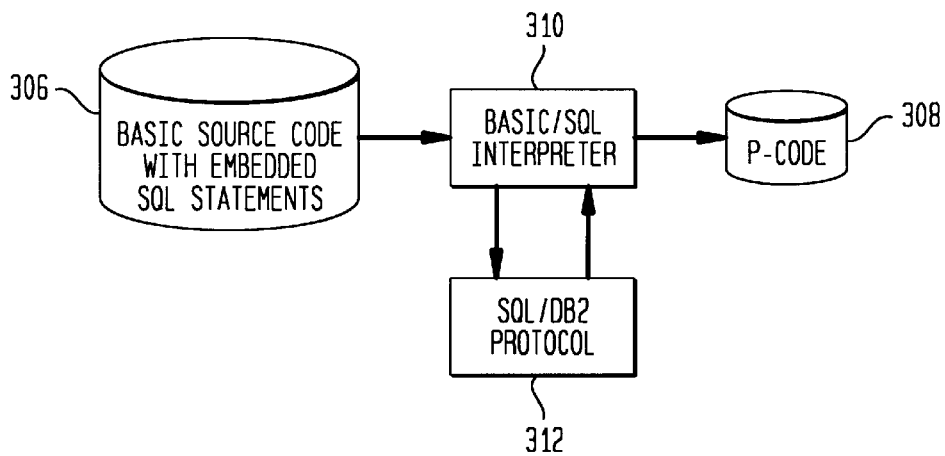
FIG. 3B shows a block diagram of one embodiment of the one-pass parsing mechanism for interpreting BASIC source code embedded with SQL statements, implementing a DB2 protocol for the SQL statements, and translating the source code to P-Code.

As shown in FIG. 3B, a specific embodiment of the present invention is described in terms of the language BASIC as the 3GL of choice and the incorporation of a BASIC/SQL interpreter 310. Description in these terms is for convenience only and is not intended to limit the invention to this embodiment. After reading the following description, it will become apparent to a person skilled in the relevant arts how to implement the invention using other 3GLs that require the use of a compiler or interpreter.

The BASIC/SQL interpreter 310 reads BASIC source code with embedded SQL statements 306 one line at a time. The BASIC/SQL interpreter 310 parses each line to determine whether it is a BASIC statement or an SQL statement. If the read line is a true BASIC statement, the BASIC/SQL interpreter 310 translates the line to p-code 308 in a manner that is well-known in the relevant art. If the read line is an SQL statement, the BASIC/SQL interpreter 310 accesses the SQL/DB2 protocol 312.

For purposes of this invention, the BASIC/SQL interpreter 310 and SQL/DB2 protocol 312 are termed DataBasic. DataBasic is directed at programmers who wish to write client/server applications with greater data access needs and that include access to database stored procedures and user defined functions on DB2 for OS/2 and DB2 for AIX/6000. DB2 is currently available from IBM and pertinent aspects of DB2 are described in many publicly available documents, such as DATABASE 2 OS/2 Programming Reference, Order Number S62G-3666-00, March 1993, DATABASE 2 AIX/6000 Programming Reference, Order Number SC09-1573-00, 1993, and IBM Operating System/2 Extended Edition Database Manager Programming Guide and Reference, 90X7905, which are incorporated herein by reference in their entireties.

DataBasic further lets application developers write embedded static SQL statements for DB2 in an interpreted 3GL such as BASIC and is capable of optimizing the translation process for such static SQL statements. For static SQL statements, the syntax of the SQL statements is fully known at the time of translation. In contrast, dynamic SQL statements can be part or all specified at run-time. When a static SQL statement is prepared during translation, an executable form of the statement is created. The executable form is known as an access plan, is embodied in a bind file, and stored in the database as a package. Because a static SQL statement is fully known at the time of translation, DB2 does not need to do full-scale processing of the SQL statement at run time. Access plans are well known in the relevant art and can be implemented by a person of ordinary skill.

In operation, when the BASIC/SQL interpreter 310 encounters an SQL statement, the SQL statement is parsed to identify all host variables. For each host variable, the characteristics of each data type and length are determined and converted into DB2 format. The BASIC/SQL interpreter 310 makes subroutine calls to SQL/DB2 protocol 312 and receives in return an array of function pointers. The array comprises an array of address pointers to low level API function calls and parameters. After the translation to an array of function pointers is completed, the BASIC/SQL interpreter 310 generates the equivalent p-code 308 for the SQL statement, annotates the p-code with references to the corresponding line of BASIC source code, and executes the p-code.

A complete description of SQL/DB2 protocol and array of function pointers can be found in the patent application titled "PASSING STRUCTURES OR ARRAYS AS HOST VARIABLES," Ser. No. 08/521,710 now U.S. Pat. No. 5,742,810, which has an effective filing date identical with that of the present invention and is incorporated herein by reference in its entirety. A complete description of the low level API calls and parameters is provided in several DB2 manuals, such as DATABASE 2 AIX/6000 Programming Reference, SC09-1573 (1993), "Appendix D. Precompiler Customization," pages 307–372 which is herein incorporated by reference in its entirety.

The BASIC/SQL interpreter 310 also provides, at the user's option, for the generation of a p-code file that remains after interpretation for later use. Conventional interpreters discard the p-code after interpretation. In such a scenario, the source code would have to be interpreted for every execution. By not discarding the p-code and generating a p-code file, a user only has to re-execute the p-code file. The interpreter does not re-interpret the source code for another execution.

As a result of the above description, a source level debugger can now debug source code with embedded SQL statements. The source level debugger operates like any other conventional source level debugger because the generated object code is correctly annotated with references to lines of source code.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A method for translating source code to p-code or machine-language instructions, wherein the source code contains high-level source code with embedded SQL statements, said method comprising the steps of:

(1) reading the source code one line at a time to generate a read line of source code;

(2) determining whether said read line of source code is a line of high level source code or an SQL statement;

(3) translating said read line of source code to p-code or machine-language instructions, wherein said translation of said read line of source code occurs in a one-pass parsing mechanism which translates said line of high level source code if it is determined in step (2) that said read line of source code is said line of high level source code, and which translates said SQL statement if it is determined in step (2) that said read line of source code is said SQL statement, wherein said SQL statement is translated to an array of function pointers; and (4) annotating each of said p-code or machine-language instructions wherein said annotation identifies said read line of source code corresponding to said each of said p-code or machine-language instructions.

2. A method for translating source code to p-code or machine-language instructions, wherein the source code contains high-level source code with embedded SQL statements, said method comprising the steps of:

(1) reading the source code one line at a time to generate a read line of source code;

(2) determining whether said read line of source code is a line of high level source code or an SQL statement;

(3) translating said read line of source code to p-code or machine-language instructions, wherein said translation of said read line of source code occurs in a one-pass parsing mechanism which translates said line of high level source code if it is determined in step (2) that said read line of source code is said line of high level source code, and which translates said SQL statement if it is determined in step (2) that said read line of source code is said SQL statement; and (4) annotating each of said p-code or machine-language instructions wherein said annotation identifies said read line of source code corresponding to said each of said p-code or machine-language instructions.

3. A method for translating source code to p-code or machine-language instructions according to claim 2, wherein if said read line of source code is a static SQL statement, said translation of said read line of source code is optimized by an access plan.

4. A method for translating source code to p-code or machine-language instructions according to claim 2, wherein if said read line of source code is an SQL statement, said translation of said read line of source code processes and maintains the scope of variables.

5. A method for translating source code to p-code or machine-language instructions according to claim 2, further comprising writing said p-code or machine-language instructions to an output executable file.

6. A method for translating source code to p-code or machine-language instructions according to claim 2, wherein said one-pass parsing mechanism comprises translating said SQL statement to a plurality of API statements.

7. A method for translating source code to p-code or machine-language instructions according to claim 2, wherein said one-pass parsing mechanism comprises translating said SQL statement to an array of function pointers.

8. A system for translating source code to p-code or machine-language instructions, wherein the source code contains high level source code with embedded SQL statements, comprising:

reading means to read the source code one line at a time and generate a read line of source code;

determining means to identify said read line of source code as a line of high level source code or an SQL statement;

translating means to parse said read line of source code and generate p-code or machine-language instructions, wherein said translating means occurs in a one-pass parsing mechanism which translates said line of high level source code if it determined that said read line of source code is said line of high level source code, and which translates said SQL statement if it is determined that said read line of source is said SQL statement; and annotating means to annotate said p-code or machine-language instructions with a reference to a corresponding line of source code.

9. A system for translating source code to p-code or machine-language instructions according to claim 8, wherein if said read line of source code is a static SQL statement, said translating means of said read line of source code is optimized by an access plan.

10. A system for translating source code to p-code or machine-language instructions according to claim 8, wherein if said read line of source code is an SQL statement, said translating means of said read line of source code processes and maintains the scope of variables.

11. A system for translating source code to p-code or machine-language instructions according to claim 8, further comprising writing means to write said p-code or machine-language instructions to an output executable file.

12. A system for translating source code to p-code or machine-language instructions according to claim 8, wherein said one-pass parsing mechanism of said translating means comprises translating said SQL statement to a plurality of API statements.

13. A system for translating source code to p-code or machine-language instructions according to claim 8, wherein said one-pass parsing mechanism of said translating means comprises translating said SQL statement to an array of function pointers.

14. An article of manufacture comprising:

a computer usable medium having computer readable program code means embodied therein for causing a translation from source code to p-code or machine-language instructions, wherein the source code contains high level source code embedded with SQL statements, said computer readable program code means in said article of manufacture comprising:

computer readable program code means for causing a computer to read the source code one line at a time and generate a read line of source code;

computer readable program code means for causing a computer to determine whether said read line of source code is a line of high-level source code or an SQL statement;

computer readable program code means for causing a computer to translate said read line of source code to p-code or machine-language instructions, wherein said translation of said read line of source code occurs in a one-pass parsing mechanism which translates said line of high level source code if it is determined that said read line of source code is said line of high level source code, and which translates said SQL statement if it is determined that said read line of source code is said SQL statement; and computer readable program code means for causing the computer to annotate each of said p-code or machine-language instructions wherein said annotation identifies said read line of source code corresponding to said each of said p-code or machine-language instructions.

15. An article of manufacture according to claim 14 wherein if said read line of source code is a static SQL statement, said translation of said read line of source code is optimized by an access plan.

16. An article of manufacture according to claim 14 wherein if said read line of source code is an SQL statement, said translation of said read line of source code processes and maintains the scope of variables.

17. An article of manufacture according to claim 14, further comprising writing said p-code or machine-language instructions to an output executable file.

18. An article of manufacture according to claim 14, wherein said one-pass parsing mechanism comprises translating said SQL statement to a plurality of API statements.

19. An article of manufacture according to claim 14, wherein said one-pass parsing mechanism comprises translating said SQL statement to an array of function pointers.

20. A program storage device readable by a machine, tangibly embodying a program of instructions executable by the machine to perform method steps for translating source code to p-code or machine-language instructions, wherein the source code contains high-level source code with embedded SQL statements, said method steps comprising:

(1) reading the source code one line at a time to generate a read line of source code;

(2) determining whether said read line of source code is a line of high-level source code or an SQL statement;

translating said read line of source code to p-code or machine-language instructions, wherein said translation of said read line of source code occurs in a one-pass parsing mechanism which translates said line of high level source code if it is determined in step (2) that said read line of source code is said line of high level source code, and which translates said SQL statement if it is determined in step (2) that said read line of source code is said SQL statement; and annotating each of said p-code or machine-language instructions wherein said annotation identifies said read line of source code corresponding to said each of said p-code or machine-language instructions.

21. A program storage device according to claim 20, wherein if said read line of source code is a static SQL statement, said translating of said read line of source code is optimized by an access plan.

22. A program storage device according to claim 20 wherein if said read line of source code is an SQL statement, said translating of said read line of source code processes and maintains the scope of variables.

23. A program storage device according to claim 20, further comprising writing said p-code or machine-language instructions to an output executable file.

24. A program storage device according to claim 20, wherein said one-pass parsing mechanism comprises translating said SQL statement to a plurality of API statements.

25. A program storage device according to claim 20, wherein said one-pass parsing mechanism comprises translating said SQL statement to an array of function pointers.

* * * * *